May 19, 1942.    W. L. HANSEN ET AL    2,283,363
SLOW SPEED SELF-STARTING SYNCHRONOUS MOTOR
Filed July 3, 1939    2 Sheets-Sheet 1
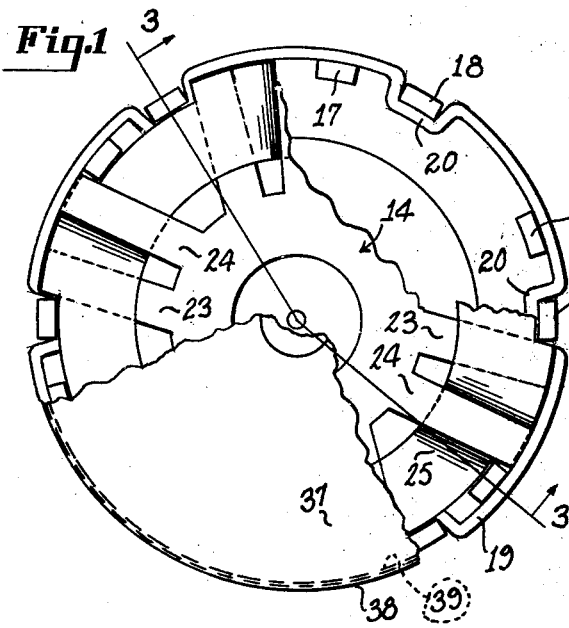
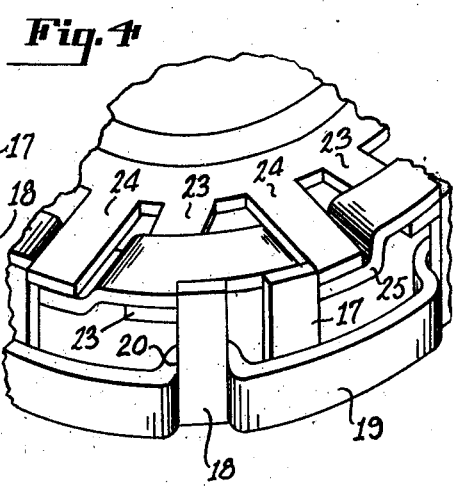
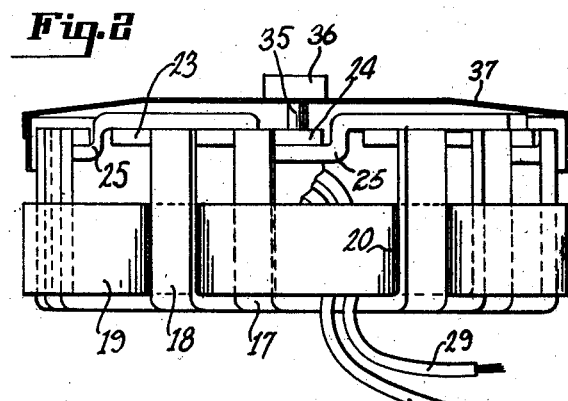
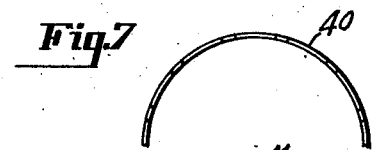
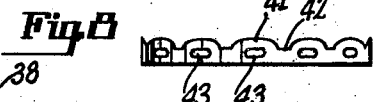
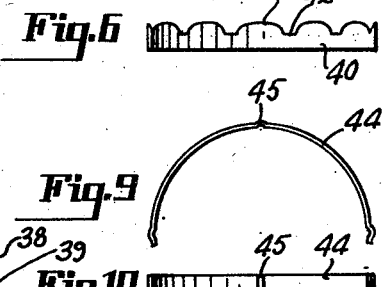
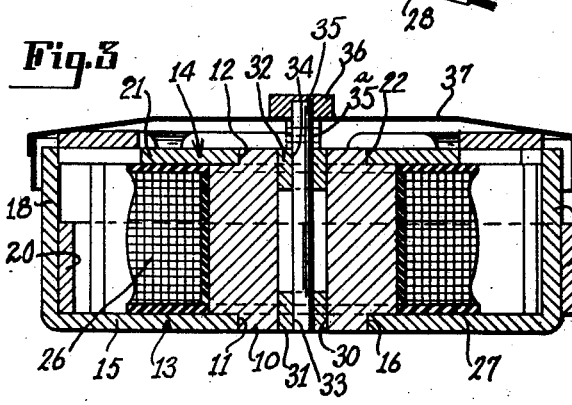
INVENTOR
WILLIAM L. HANSEN
BY IRA N. HURST
ATTORNEYS

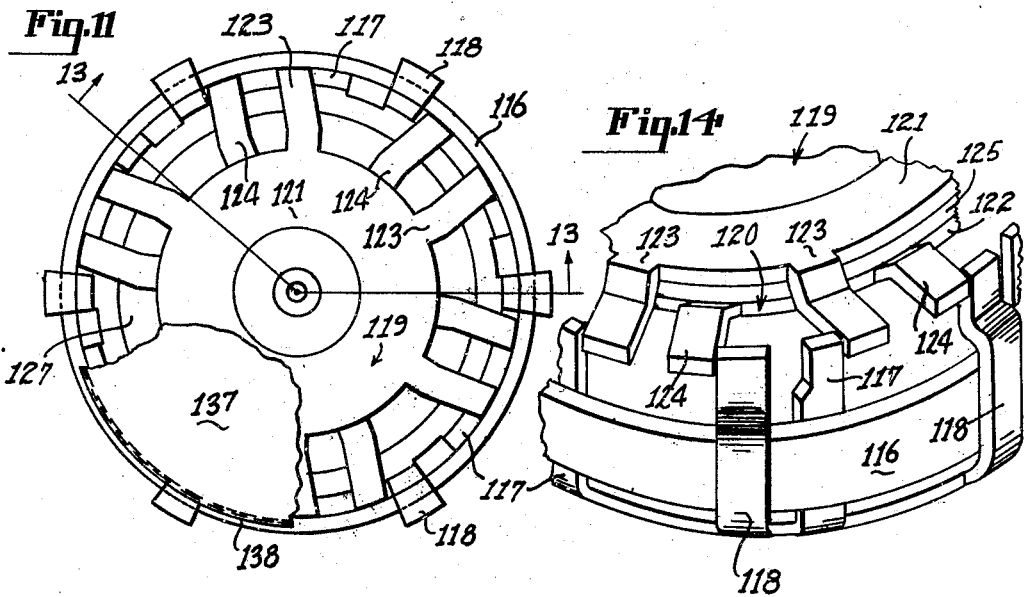
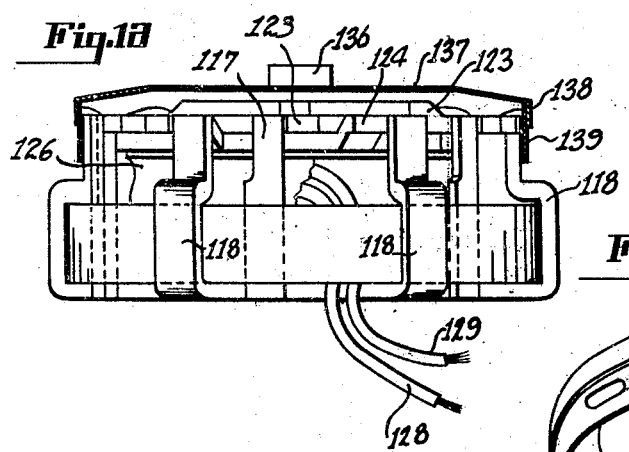
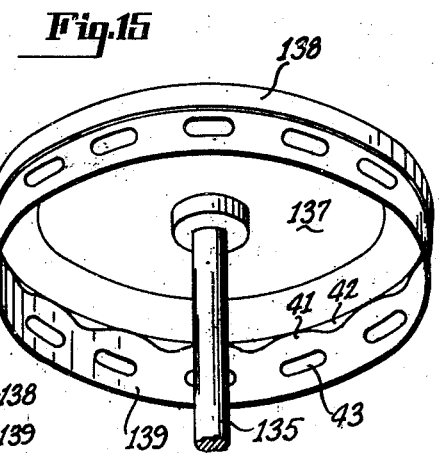
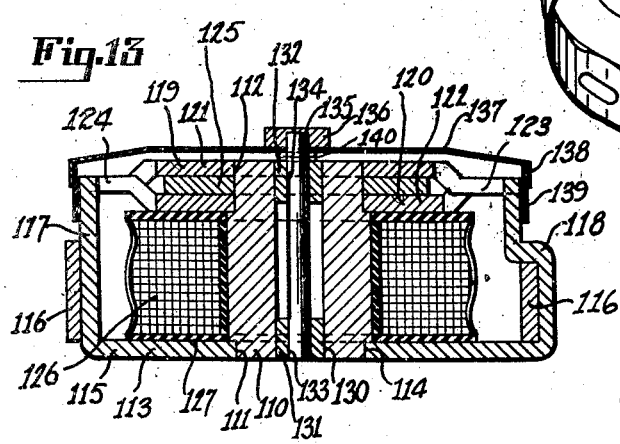

Patented May 19, 1942

2,283,363

UNITED STATES PATENT OFFICE 2,283,363

SLOW SPEED SELF-STARTING SYNCHRONOUS MOTOR

William L. Hansen and Ira N. Hurst, Princeton, Ind., assignors to Hansen Mfg. Company, Inc., Princeton, Ind., a corporation of Indiana Application July 3, 1939, Serial No. 282,718

10 Claims. (Cl. 172—278)

This invention relates to electric motors, and in particular, to electrical synchronous motors such as are employed for operating clocks.

One object of this invention is to provide a slow speed electrical synchronous motor having self-starting characteristics and a relatively low current consumption for a given power output.

Another object is to provide a self-starting slow speed synchronous motor having field poles shaded by an undulating shading ring which passes around three sides of alternate poles as it proceeds around the field structure.

Another object is to provide a slow speed self-starting synchronous motor having a radially thin axially elongated rotor, preferably with projections thereon.

Another object is to provide such a motor with a rotor constituting a cylindrical band with scalloped edges, and preferably with apertures adjacent the scalloped portions.

Another object is to provide such a motor with a rotor consisting of a cylindrical band having projections directed radially outward therefrom at intervals.

Another object is to provide a slow speed self-starting synchronous motor having a field structure consisting of two spaced poles coming from opposite ends of a field core, the inner set of poles consisting of a disc with radially projecting fingers and the outer set consisting of a disc with axially projecting fingers, the tips of the two sets of fingers closely approaching one another, alternate poles of each set of fingers being shaded by an undulating shading ring extending around three sides of each shaded pole.

Another object is to provide a slow speed self-starting synchronous motor having a field structure consisting of a plurality of discs mounted upon a magnetic hub surrounded by a field coil, one set of discs mounted at one end of said hub having axially projecting pole pieces and two other discs mounted at the opposite end of the hub having radially projecting pole pieces, the tips of which extend into proximity to the tips of the axially projecting pole pieces, the discs with the radial pole pieces being separated by a disc of non-magnetic material for shading one set of poles from the other.

Another object is to provide a motor as set forth in the preceding object, wherein the axially directed poles are shaded by an annular band of non-magnetic material disposed with alternate poles passing on opposite sides of this band.

In the drawings:

Figure 1 is a top plan view of the motor of this invention with portions of the rotor structure and field coil structure broken away, respectively, to disclose the structure therebeneath.

Figure 2 is a side elevation of the motor shown in Figure 1, with the rotor structure shown in diametrical cross section in order to disclose the field structure more clearly.

Figure 3 is an axial section through the motor of Figure 1, taken along the line 3—3 in Figure 1.

Figure 4 is an enlarged top perspective view of the motor of Figures 1, 2 and 3, with the rotor structure removed.

Figure 5 is an edge view of a modified form of rotor for use with the motor of Figures 1 to 4.

Figure 6 is a side elevation of the rotor shown in Figure 5.

Figure 7 is an edge view of a portion of another modified rotor.

Figure 8 is a side elevation of the modified rotor shown in Figure 7.

Figure 9 is an edge view of a portion of another modified rotor.

Figure 10 is a side elevation of the modified rotor of Figure 9.

Figure 11 is a top plan view of a modified motor according to the invention, with the rotor removed and with a portion of the field structure broken away to disclose the structure therebeneath more clearly.

Figure 12 is a side elevation of the modified motor shown in Figure 11, with the rotor structure in diametrical cross section to disclose the field structure more clearly.

Figure 13 is an axial section through the motor of Figures 11 and 12, taken along the line 13—13 in Figure 11.

Figure 14 is an enlarged top perspective view of a portion of the motor shown in Figures 11 to 13, with the rotor structure removed.

Figure 15 is a perspective view of one type of rotor assembly suitable for use with the motors of Figures 1 to 11, and employing the rotor of Figures 5 and 6.

Referring to the drawings in detail, Figure 1 shows a preferred embodiment of the slow speed self-starting synchronous motor of this invention. This motor consists of a magnetic tubular hub 10 having reduced diameter portions 11 and 12, upon which are mounted the outer and inner field pole assemblies, generally designated 13 and 14 respectively (Figure 3). The outer field pole structure 13 consists of a disc 15 having an aperture 16 by which it is mounted upon the reduced diameter portion 11, and likewise having axially directed pole pieces 17 and 18 disposed alternately in a cylindrical path around the hub 10.

The alternate pole pieces 17 and 18 are shaded by an undulating ring 19 of non-magnetic metal, such as copper. This undulating ring 19 passes over the outer surfaces of the pole pieces 17 and therefore does not shade them. The shading ring 19, however, is provided with undulating portions 20 passing around three sides of the pole pieces 18, thereby shading these pole pieces and providing a phase lag when the field structure is magnetized by an alternating current.

The inner field pole assembly 14 consists of a disc portion 21 (Figure 3) having an aperture 22 by which it is mounted upon the magnetic hub 10, and also has radially extending pole pieces 23 and 24, arranged in pairs around the periphery of the disc portion 21. The pole pieces 24, which alternate with the pole pieces 23, are shaded by an undulating ring of non-magnetic metal, such as copper, this shading ring having undulating portions 25 passing around three sides of each of the pole pieces 24 so as to shade these pole pieces. The shading ring 25, however, merely passes across the front face of each field pole 23 and therefore does not shade it. The tips of the shaded outer pole pieces 18 are arranged adjacent the tips of the unshaded inner pole pieces 23, with a slight air gap therebetween to provide a magnetic leakage path. On the other hand, the tips of the unshaded outer field poles 17 are arranged adjacent the tips of the shaded inner poles 24 (Figure 4), with a similar narrow air gap for a magnetic leakage path.

The field structure thus formed is magnetized by a field coil 26 mounted in an annularly grooved insulating member 27, encircling the magnetic hub 10 and having leads 28 and 29 for connection to a suitable source of alternating current. The magnetic hub 10 is provided with an axial bore 30 having plugs 31 and 32 mounted therein. The plugs 31 and 32 have axial bores 33 and 34, the walls of which form bearing surfaces for the rotor shaft 35. Washers 35ª may be provided on the shaft 35 to serve as thrust bearings for the free rotation of the rotor. Mounted upon the rotor shaft 35 is a hub 36 carrying a web 37, which may consist either of a solid disc or of radiating spokes, a solid disc being shown for convenience. The web 37 terminates in a cylindrical flange 38 which receives the rotor 39, which is in the form of a cylindrical band of hardened magnetic steel.

The rotor 39 is radially thin and axially wide, light in weight and preferably in a single piece. The rotor 39 may consist either of a plain band of steel, as shown in Figures 1 to 3, or it may have the modified structure shown in Figures 5 to 10 and 15.

The modified rotor 40, shown in Figures 5 and 6, consists of a band of magnetized hardened steel having scalloped portions 41 extending axially from the edge of the band, and separated by notches 42. The band may either be continuous or may consist of a strip of magnetic steel which is bent into circular form and sprung into place within the flange 38.

The modified rotor of Figures 7 and 8 is similar to the rotor shown in Figures 5 and 6, but additionally possesses apertures 43 adjacent the high points in the scalloped portions 41.

The modified form of rotor 44 shown in Figures 9 and 10 consists of a cylindrical band of hardened magnetic steel, possessing circumferentially spaced ridges or protuberances 45 extending outwardly from the surface of the band. As in the rotor constructions of Figures 5 to 8, the rotor 44 may consist of a continuous cylindrical band, or it may be formed of a straight strip of hardened magnetic steel which is bent into a cylindrical shape and sprung into the space within the flange 38.

In the operation of the motor shown in Figures 1 to 10, the field coil 26 is energized by connecting the leads 28 and 29 to a suitable source of alternating current, such as to the ordinary house wiring circuit of 110-volt 60-cycle alternating current. The alternation of the current alternately magnetizes the field poles with opposite polarities, but the shaded field poles undergo a phase lag relatively to the unshaded poles so that a starting force is applied to the rotor 39, causing it to rotate upon its shaft 35. The motor shaft 35 is preferably connected to reduction gearing (not shown), by which its speed is reduced to the one R. P. M. speed ordinarily employed in driving electrical synchronous clocks.

It has been found by actual test that the motor of this invention, which in the form shown has a speed of 600 revolutions per minute, possesses an unusually low current consumption, in the neighborhood of 3 watts as compared with prior-art motors having current consumption running as high as 6 watts. At the same time the motor possesses adequate power. One motor of this invention, for example, was able to pull fifteen ounces of weight mounted on a lever one inch long, with a current consumption of 35 millimeters. It will be observed that when the scalloped edge rotor 40 is employed, the scalloped portions are placed adjacent the web 37 at its junction with the flange 38.

The modified form of rotor shown in Figures 11 to 15 consists of a magnetic hub 110 having reduced diameter portions 111 and 112. Mounted upon the portion 111 is an outer field pole assembly 113 having an aperture 114 closely surrounding the reduced diameter portion 111. The field pole assembly 113 consists of a disc-like portion 115 with axially directed alternating straight poles 117 and bent poles 118. This structure is surrounded by a shading coil 116 of non-magnetic metal, such as copper, and in the form of a cylindrical band passing alternately over the straight field poles 117 and under the bent field poles 118.

Similarly mounted on the opposite end of the magnetic hub 110 are the inner field pole assemblies 119 and 120, consisting of discs 121 and 122. The discs 121 and 122 have outwardly radiating pole pieces 123 and 124, respectively. The inner field pole assemblies 119 and 120 are separated axially from each other by a disc 125 of non-magnetic metal, preferably copper, thereby providing the effect of a shading coil. The field structure is energized by a field coil or winding 126 contained in an annularly grooved insulating member 127 surrounding the magnetic hub 110. The field coil 126 is provided with leads 128 and 129 for connection to a source of alternating current. The tips of the straight outer pole pieces 117 are arranged adjacent the tips of the inner pole pieces 123, with a slight air gap therebetween for providing a magnetic leakage path. Similarly, the tips of the bent outer pole pieces 118 are arranged adjacent the tips of the inner pole pieces 124, with a similar narrow air gap forming a magnetic leakage path.

The magnetic hub 110 is provided with a bore 130 having plugs 131 and 132 mounted therein, these plugs having bores 133 and 134, the walls of which rotatably support the rotor shaft 135. The latter is provided with a hub 136 having a rotor web 137, terminating in a flange 138 for receiving the rotor 139. The rotor 139 may consist of a cylindrical band of hardened magnetic steel in the form of a cylinder which is radially thin and axially wide. The rotor 139 may employ the plain band rotor 39, the scalloped band rotor 40 with or without the apertures 43 (Figures 6 and 8), or the ridged rotor 44 (Figures 9 and 10). In Figure 15 the scalloped apertured rotor 40 of Figures 7 and 8 is shown mounted within the flange 138 of the rotor web 137. In order to facilitate the rotation of the rotor, the shaft 135 may be provided with a plurality of washers 140 between the web 137 and the plug 132.

In the operation of the motor shown in Figures 11 to 15, the leads 128 and 129 are connected to a source of alternating current, such as to the 110-volt 60-cycle alternating current supply for domestic lighting. Energization of the field coil 126 causes the magnetization of the field poles 117, 118, 123 and 124 in alternate polarity as the current alternates. The shading coils 116 and 125, however, provide a phase lag in alternate outer and inner field poles so as to impart a starting torque to the rotor 139. By this means the rotor 139 is started in rotation and rotates at a synchronized speed, depending upon the number of poles with which the motor is provided. In the example shown, the motor has a speed of 600 revolutions per minute for 110-volt 60-cycle alternating current.

It will be understood that we desire to comprehend within our invention such modifications as come within the scope of the claims and the invention.

Having thus fully described our invention, what we claim as new and desire to secure by Letters Patent, is:

1. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips adjacent the tips of said outer pole pieces, a field energizing winding associated with said core, a rotor rotatably mounted adjacent said tips of said pole pieces, and a ribbon-like shading band undulating in and out of the alternate pole pieces to contact at least three sides of the alternate pole pieces but contacting only one side of the remaining pole pieces, whereby the alternate pole pieces are shaded.

2. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips adjacent the tips of said outer pole pieces, a field energizing winding associated with said core, a rotor rotatably mounted adjacent said tips of said pole pieces, and a ribbon-like shading band undulating in and out of the alternate inner pole pieces to contact at least three sides of the alternate inner pole pieces but contacting only one side of the remaining inner pole pieces, whereby the alternate inner pole pieces are shaded.

3. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips adjacent the tips of said outer pole pieces, a field energizing winding associated with said core, a rotor rotatably mounted adjacent said tips of said pole pieces, and a ribbon-like shading band undulating in and out of the alternate outer pole pieces to contact at least three sides of the alternate outer pole pieces but contacting only one side of the remaining outer pole pieces, whereby the alternate outer pole pieces are shaded, said rotor including a cylindrical band of magnetic material having a relatively thin radial thickness and a relatively broad axial width.

4. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips adjacent the tips of said outer pole pieces, a field energizing winding associated with said core, a rotor rotatably mounted adjacent said tips of said pole pieces, and outer and inner annular shading members having undulating portions which contact with at least three sides of the alternate outer and inner pole pieces respectively, but contact only one side of the remaining outer and inner pole pieces.

5. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips adjacent the tips of said outer pole pieces, a field energizing winding associated with said core, a rotor rotatably mounted adjacent said tips of said pole pieces, and an inner shading member of approximately annular shape contacting only one side of alternate inner pole pieces and having undulations contacting at least three sides of the remaining inner pole pieces.

6. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips adjacent the tips of said outer pole pieces, a field energizing winding associated with said core, a rotor rotatably mounted adjacent said tips of said pole pieces, and an outer shading member of ribbon-like configuration and approximately cylindrical shape contacting only one side of alternate outer pole pieces and having undulating portions contacting at least three sides of the remaining outer pole pieces.

7. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips adjacent the tips of said outer pole pieces, a field energizing winding associated with said core, a rotor rotatably mounted adjacent said tips of said pole pieces, an inner shading member of approximately annular shape contacting only one side of alternate inner pole pieces and having undulations contacting at least three sides of the remaining inner pole pieces, and an outer shading member of approximately cylindrical shape contacting only one side of alternate outer pole pieces and having undulating portions contacting at least three sides of the remaining outer pole pieces.

8. A rotor for synchronous motors comprising a shaft, a support mounted on said shaft, and a cylindrical magnetic member mounted on said support coaxial with said shaft, said cylindrical magnetic member having axially extending polar projections thereon with apertures adjacent the high points of said projections.

9. A rotor for synchronous motors comprising a shaft, a support mounted on said shaft and having an annular flange, and a cylindrical magnetic member mounted withing said flange coaxial with said shaft, said cylindrical magnetic member having axially extending polar projections disposed adjacent the junction of said flange with said support.

10. A rotor for synchronous motors comprising a shaft, a support mounted on said shaft and having an annular flange, and a cylindrical magnetic member mounted within said flange coaxial with said shaft, said cylindrical magnetic member having axially extending polar projections disposed adjacent the junction of said flange with said support and with apertures adjacent the high points of said projections.

WILLIAM L. HANSEN.
IRA N. HURST.